United States Patent
Aragones et al.

(10) Patent No.: US 7,457,732 B2
(45) Date of Patent: *Nov. 25, 2008

(54) SYSTEM AND METHOD FOR MEASURING QUALITY OF BASELINE MODELING TECHNIQUES

(75) Inventors: James Kenneth Aragones, Clifton Park, NY (US); Jeffrey William Stein, Malvern, PA (US)

(73) Assignee: General Electric Company, Niskayuna, NY (US)

( * ) Notice: Subject to any disclaimer, the term of this patent is extended or adjusted under 35 U.S.C. 154(b) by 696 days.

This patent is subject to a terminal disclaimer.

(21) Appl. No.: 10/707,657

(22) Filed: Dec. 30, 2003

(65) Prior Publication Data

US 2004/0172229 A1    Sep. 2, 2004

Related U.S. Application Data

(63) Continuation-in-part of application No. 09/682,314, filed on Aug. 17, 2001.

(51) Int. Cl.
| | |
|---|---|
| *G06F 7/60* | (2006.01) |
| *G06F 17/10* | (2006.01) |
| *G06F 7/48* | (2006.01) |
| *G05B 13/02* | (2006.01) |

(52) U.S. Cl. .................... 703/2; 703/7; 701/59; 700/29; 700/30; 700/31; 702/184

(58) Field of Classification Search ............ 703/10, 703/2, 7; 701/59; 700/29–31; 702/184
See application file for complete search history.

(56) References Cited

U.S. PATENT DOCUMENTS

| | | | |
|---|---|---|---|
| 4,215,412 A | | 7/1980 | Bernier et al. |
| 5,018,069 A | * | 5/1991 | Pettigrew ..................... 701/35 |
| 5,050,081 A | | 9/1991 | Abbott et al. |
| 5,075,881 A | | 12/1991 | Blomberg et al. |
| 5,080,458 A | | 1/1992 | Hockaday |
| 5,189,606 A | | 2/1993 | Burns et al. |
| 5,197,127 A | | 3/1993 | Waclawsky et al. |
| 5,408,412 A | | 4/1995 | Hogg et al. |
| 5,687,082 A | | 11/1997 | Rizzoni |
| 5,727,128 A | * | 3/1998 | Morrison ..................... 706/45 |
| 6,003,808 A | | 12/1999 | Nguyen et al. |

(Continued)

FOREIGN PATENT DOCUMENTS

EP           1146468        10/2001

(Continued)

OTHER PUBLICATIONS

U.S. Appl. No. 10/707,655, Aragones.

(Continued)

*Primary Examiner*—Paul L Rodriguez
*Assistant Examiner*—Dwin M Craig
(74) *Attorney, Agent, or Firm*—Penny A. Clarke (57) ABSTRACT

System, method and computer product for baseline modeling a product or process. A service database contains process data. A preprocessor processes the data into a predetermined format. A baseline modeling component builds a baseline model from the preprocessed data, wherein the baseline model relates process performance variables as a function of process operating conditions.

24 Claims, 6 Drawing Sheets

U.S. PATENT DOCUMENTS

| | | | |
|---|---|---|---|
| 6,047,593 | A | 4/2000 | Scher et al. |
| 6,067,486 | A | 5/2000 | Aragones et al. |
| 6,125,312 | A | 9/2000 | Nguyen et al. |
| 6,151,582 | A | 11/2000 | Huang et al. |
| 6,216,066 | B1 | 4/2001 | Goebel et al. |
| 6,223,143 | B1 | 4/2001 | Weinstock et al. |
| 6,243,696 | B1 | 6/2001 | Keeler et al. |
| 6,317,654 | B1 | 11/2001 | Gleeson et al. |
| 6,408,259 | B1 | 6/2002 | Goebel et al. |
| 6,473,677 | B1 | 10/2002 | Hershey et al. |
| 6,487,479 | B1 | 11/2002 | Nelson |
| 6,487,490 | B1 | 11/2002 | Kamath et al. |
| 6,519,575 | B1 | 2/2003 | Goebel |
| 6,591,182 | B1 | 7/2003 | Cece et al. |
| 6,601,015 | B1 | 7/2003 | Milvert et al. |
| 6,606,580 | B1 | 8/2003 | Zedda et al. |
| 6,631,384 | B1 | 10/2003 | Richman et al. |
| 6,799,154 | B1 | 9/2004 | Aragones et al. |
| 6,832,205 | B1 | 12/2004 | Aragones et al. |
| 7,031,878 | B2 | 4/2006 | Cuddihy et al. |
| 2001/0032109 | A1 | 10/2001 | Gonyea et al. |
| 2002/0173897 | A1 | 11/2002 | Leamy et al. |
| 2003/0034995 | A1 | 2/2003 | Osborn et al. |
| 2003/0036891 | A1 | 2/2003 | Aragones et al. |
| 2003/0045992 | A1 | 3/2003 | Humerickhouse et al. |
| 2004/0172228 | A1 | 9/2004 | Aragones |

FOREIGN PATENT DOCUMENTS

| | | |
|---|---|---|
| EP | 1160712 | 12/2001 |

OTHER PUBLICATIONS

U.S. Appl. No. 10/707,656, Aragones.

"Multiple Regression," http://www2.chass.nscu.edu/garson/pa765/regress.htm, pp. 1-27 (printed Oct. 22, 2003).

"Introduction to Regression Analysis," http://www.nlreg.com/intro.htm, pp. 1-3 (printed Oct. 22, 2003).

R. A. Johnson et al., "Multivariate Linear Regression Models," Applied Multivariate Statistical Analysis, Chapter 7, 1988, pp. 273-339.

B. Curtis et al., "Process Modeling," Association for Computing Machinery, Communications of the ACM, Sep. 1992, pp. 75-90.

M. A. Schuldt et al., "Alternative Approaches to Baseline Estimation Using Calibrated Simulations," ASHRAE Transactions, 1998, pp. 871-879.

\* cited by examiner

SYSTEM AND METHOD FOR MEASURING QUALITY OF BASELINE MODELING TECHNIQUES

CROSS REFERENCE TO RELATED APPLICATIONS

The present application is a continuation-in-part of co-pending U.S. patent application Ser. No. 09/682,314, filed on Aug. 17, 2001, the entirety of which is incorporated by reference herein.

BACKGROUND OF THE INVENTION

The present invention relates generally to systems and methods for improving the quality and productivity of a product or process and more particularly to baseline modeling of a product or process.

Baseline modeling of a product or process generally provides an understanding of the performance of an ideal product or process over time. An engine is one type of product or process that baseline modeling is suitable for use. Engine baseline modeling has a multitude of uses including, but not limited to, determining when an engine performs out of specification, predicting when an engine failure will occur, detecting abnormal conditions, determining the quality of an engine and designing new engines. Typically, engine baseline models are developed from data gathered from thermodynamic cycle analyses and simulation. First, models of ideal values are created and indexed by variables such as altitude, temperature, power setting, and air speed. Once data from the normal operation of the engine is available, these models are updated by analyzing data corresponding to a particular model characteristic. An engineer then looks for data that are similar for the specified engine variables (e.g., altitude, temperature, power setting, air speed), groups the similar data, averages them for each variable and performs other operations as desired. The engineer then plots data for each of the variables. The plots provide interrelationship information between each of the engine variables, which the engineer uses to create tables of typical operation parameters the baseline model. These tables of parameters are used as the basis of comparison for engine operation. Differences from the baseline model may indicate engine faults or deterioration trends.

There are several problems associated with this type of engine baseline modeling. First, this type of engine baseline modeling is very labor intensive because the engineer has to review the data, find data that are similar, group and average the data, perform other desired operations on the data, plot the data and create tables. Another problem is that one engineer cannot readily reproduce an engine baseline model developed by another engineer because this process is very individualized. It is helpful if one engineer can reproduce the engine baseline model generated by another engineer to validate quality of the baseline. Another problem associated with this type of engine baseline model is that the resulting model does not provide a good picture of an engine operating outside normal conditions. Furthermore, this type of engine baseline modeling does not provide a measure of how good the developed model is.

Accordingly, there is a need in the art of statistical modeling for an automated approach to engine baseline modeling that standardizes the process to improve reliability by minimizing human interventions.

BRIEF SUMMARY OF THE INVENTION

The present invention overcomes the problems noted above, and provides additional advantages, by providing a system, method and computer readable medium that stores instructions for instructing a computer system, to perform engine baseline modeling. In one embodiment of the present invention, an engine service database contains engine data. A preprocessor processes the engine data into a predetermined format. An engine baseline modeling component builds an engine baseline model from the preprocessed data, wherein the engine baseline model relates engine performance variables as a function of engine operating conditions. A model diagnostics component evaluates the performance of the engine baseline model. Engine data from a plurality of engines is compared against the engine baseline model. Engine trends are generated for each of the plurality of engines. Correlations between the engine trends and various parameters are identified. Summary statistics relating to the degree of correlation are calculated for each identified correlation.

In a second aspect of this disclosure, there is a system, method and computer readable medium that stores instructions for instructing a computer system, to perform engine baseline modeling. In this embodiment, an engine service database contains engine data. A preprocessor processes the engine data into a predetermined format. An engine baseline modeling component builds an engine baseline model from the preprocessed data, wherein the engine baseline model relates engine performance variables as a function of engine operating conditions. A model diagnostics component evaluates the performance of the engine baseline model. The model diagnostics component evaluates, in time order, a subset of the engines used to create the model. The model diagnostics component generates time-varying system trends. The model diagnostics component plots data points representative of the time-varying system trends over time and fits a smoothed curve to the plotted data points. The model diagnostics component then computes residual errors for each point.

BRIEF DESCRIPTION OF THE DRAWINGS

The present invention can be understood more completely by reading the following Detailed Description of Preferred Embodiments, in conjunction with the accompanying drawings.

DETAILED DESCRIPTION OF THE PREFERRED EMBODIMENTS

Figure 1:
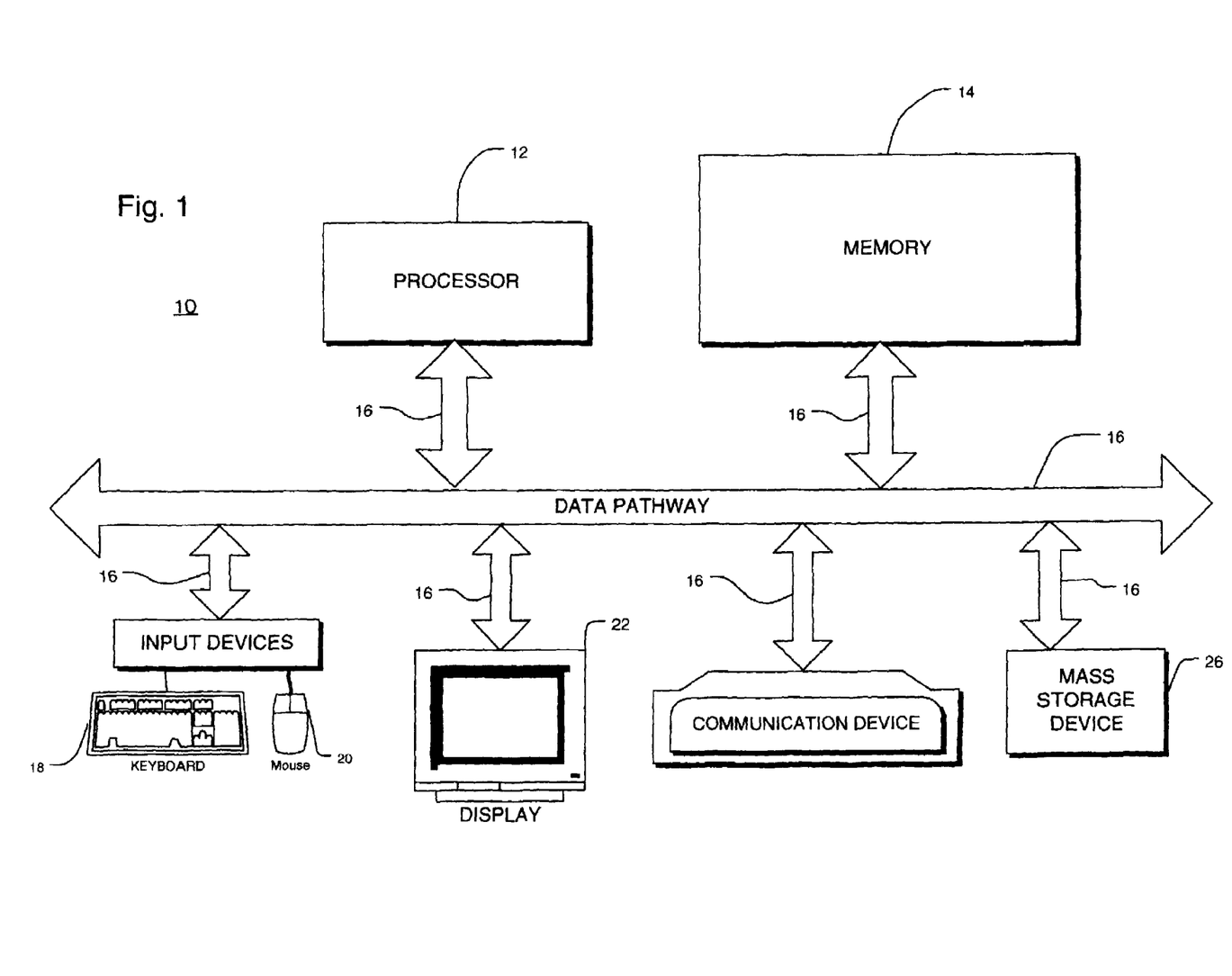
FIG. 1 shows a schematic diagram of a general-purpose computer system in which a system for performing engine baseline modeling operates.

This disclosure describes a system, method and computer product for baseline modeling of a product or process such as an aircraft engine, however, the disclosure is applicable to any type of product or process where it is desirable to model performance. FIG. 1 shows a schematic diagram of a general-purpose computer system in which a system for performing engine baseline modeling operates. The computer system 10 generally comprises a processor 12, memory 14, input/output devices, and data pathways (e.g., buses) 16 connecting the processor, memory and input/output devices. The processor 12 accepts instructions and data from memory 14 and performs various operations. The processor 12 includes an arithmetic logic unit (ALU) that performs arithmetic and logical operations and a control unit that extracts instructions from memory 14 and decodes and executes them, calling on the ALU when necessary. The memory 14 generally includes a random-access memory (RAM) and a read-only memory (ROM), however, there may be other types of memory such as programmable read-only memory (PROM), erasable programmable read-only memory (EPROM) and electrically erasable programmable read-only memory (EEPROM). Also, memory 14 preferably contains an operating system, which executes on the processor 12. The operating system performs basic tasks that include recognizing input, sending output to output devices, keeping track of files and directories and controlling various peripheral devices.

The input/output devices may comprise a keyboard 18 and a mouse 20 that enter data and instructions into the computer system 10. Also, a display 22 may be used to allow a user to see what the computer has accomplished. Other output devices may include a printer, plotter, synthesizer and speakers. A communication device 24 such as a telephone or cable modem or a network card such as an Ethernet adapter, local area network (LAN) adapter, integrated services digital network (ISDN) adapter, Digital Subscriber Line (DSL) adapter or wireless access card, enables the computer system 10 to access other computers and resources on a network such as a LAN, wireless LAN or wide area network (WAN). A mass storage device 26 may be used to allow the computer system 10 to permanently retain large amounts of data. The mass storage device may include all types of disk drives such as floppy disks, hard disks and optical disks, as well as tape drives that can read and write data onto a tape that could include digital audio tapes (DAT), digital linear tapes (DLT), or other magnetically coded media. The above-described computer system 10 can take the form of a hand-held digital computer, personal digital assistant computer, notebook computer, personal computer, workstation, mini-computer, mainframe computer or supercomputer.

Figure 2:
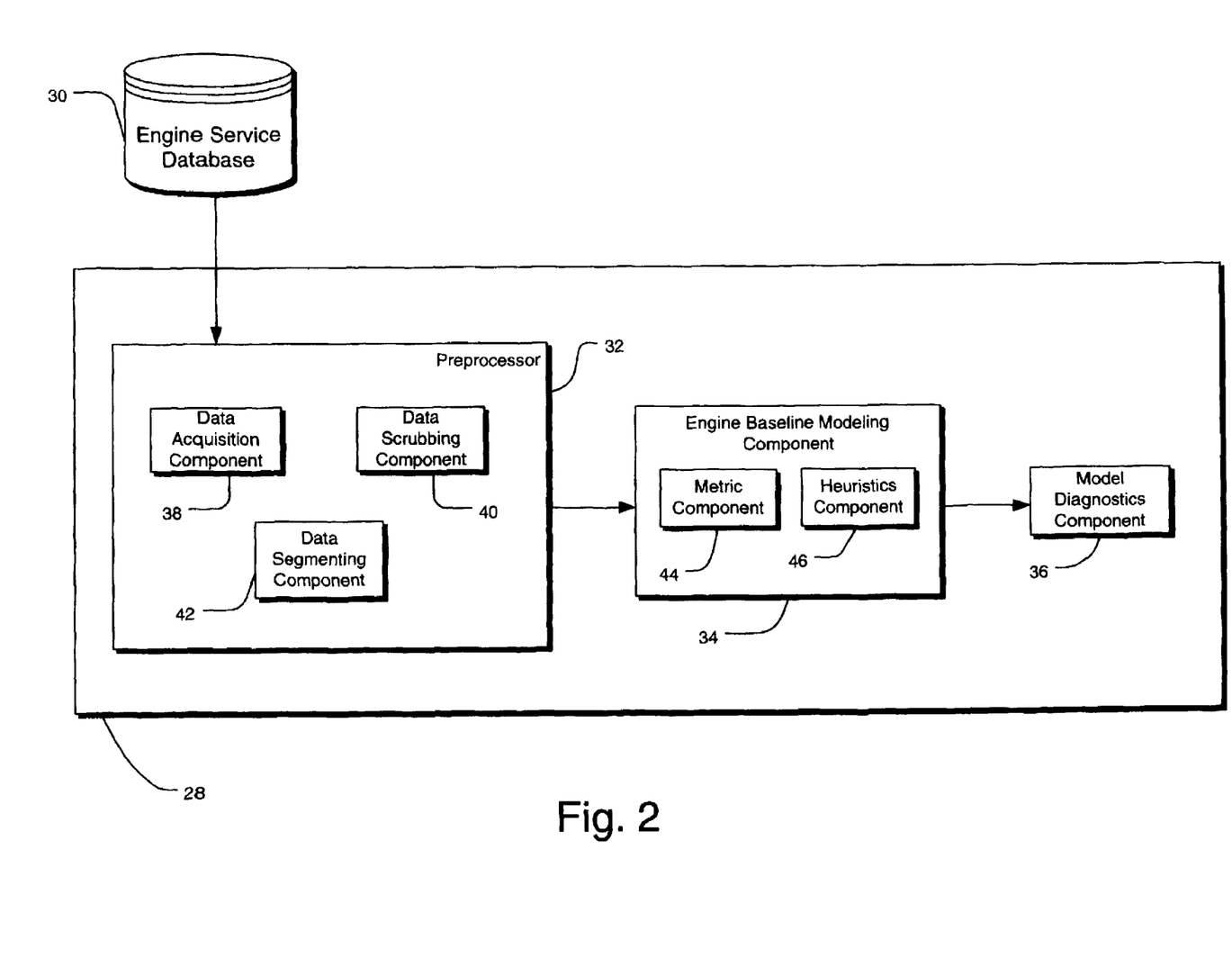
FIG. 2 shows a top-level component architecture diagram of the engine baseline modeling system that operates on the computer system shown in FIG. 1.

FIG. 2 shows a top-level component architecture diagram of an engine baseline modeling system 28 that operates on the computer system 10 shown in FIG. 1. Generally, the engine baseline modeling system 28 models the performance of an "ideal engine for a specified type aircraft engine. An engine baseline model built with the engine baseline modeling system 28 has a multitude of uses. An illustrative, but non-exhaustive list of potential uses for an engine baseline model built from the engine baseline modeling system 28 includes monitoring engine status, predicting future engine behavior, diagnosing engine faults, determining when an engine performs out of specification, determining the quality of an engine and designing new systems for an engine.

In FIG. 2, there is an engine service database 30 that contains engine data for a variety of aircraft engines. The engine data comprises an assortment of engine performance information for each of the engines. Generally, engine performance information includes environmental data in which the engines operate such as altitude, air temperature, air speed, engine loading, engine temperature and pressure. One of ordinary skill in the art will recognize that the engine service database 30 may comprises other engine performance information such as mach, fan speed, etc. In addition, the engine service database 30 may comprise other data such as operational data. A non-exhaustive list of engine operational data stored in the engine service database 30 includes exhaust gas temperatures (EGT), shaft speed between compressors and turbines (Ni and N2), pressure combustion (Pa) and fuel flow (WF). One of ordinary skill in the art will recognize that other engine operational data may include engine bleed settings, vibration readings, and control mechanism settings. Also, the engine service database 30 may comprise other data such as aircraft operating and settings data (e.g., bleed settings).

One of ordinary skill in the art will recognize that there are a variety of approaches to acquiring the above data and storing them in the engine service database 30. For example, some data can be captured automatically using on-line data acquisition techniques, while other data can be captured using manually recording techniques or onboard data capture techniques. Furthermore, the engine service database 30 preferably stores the data in a format that permits users to import the data into other tools for further analysis, such as Microsoft EXCEL®, Minitab, and SAS.

The engine service database 30 may comprise other types of data for the engines. For example, the engine service database 30 may comprise service information for the engines. Generally, the service information will comprise information such as engine product information, age information of the engines and repair history of the engines (e.g., dates of service events, types of service events, etc.). Other types of engine data stored in the engine service database 30 may include in-flight data, engine utilization data (e.g., where, when, how flown), ownership data, remote monitoring and diagnostics status data.

Referring to FIG. 2, the engine baseline modeling system 28 comprises a preprocessor 32 that processes the engine data into a predetermined format. In particular, the preprocessor 32 comprises a data acquisition component 38 that extracts the engine data from the engine service database 30. The data acquisition component 38 acquires the service data by using commercially available modules available from Minitab, Microsoft, Oracle, etc. which directly extract the data into the engine baseline modeling system 28, however, one of ordinary skill in the art will recognize that one can write specialized code to extract the data into a common format and write additional specialized code to import that into the system.

The preprocessor 32 performs computations that simplify future processing of the data, while a data scrubbing component 40 cleans the engine data. In particular, the preprocessor 32 performs operations that convert the data into standard units. For example, the preprocessor 32 can convert temperature data from Celsius to Kelvin or correct engine power setting data by the engine bleed settings. Other types of corrections that the preprocessor 32 may perform include converting pounds to kilograms, altitude to pressure, knots and altitude to mach number. One of ordinary skill in the art will recognize that the listed corrections are only illustrative of some possibilities and are not exhaustive of other possibilities. Furthermore, one of ordinary skill in the art will recognize that the preprocessor 32 can perform the corrections in any manner desired (e.g., Celsius to Rankine) and is not limited to the above order. Examples of cleaning operations performed by the data scrubbing component 40 include discarding data elements with missing values, correcting simple typographical errors, discarding data elements with erroneous values out of reasonable operating range, etc. One of ordinary skill in the art will recognize that the listed cleaning operations are only illustrative of some possibilities and are not exhaustive of other possibilities.

In addition, the preprocessor also comprises a data segmenting component 42 that segments engine data into groups, nodes or clusters that represent similar operating conditions. The groups generally include engine performance variables such as power setting, altitude, air speed (mach number), and air temperature. One of ordinary skill in the art will recognize that other engine performance variables such as air humidity and control settings may be selected and that the disclosure should not be limited to these variables. Once the groups have been selected, then the data segmenting component 42 can segment the data into the particular group that it relates to. Once the data are segmented into the groups, then the data segmenting component 42 can use a cluster analysis to determine clusters of operating conditions. Alternatively, an engineer may assign bands of operations of interest for each of the variables.

An engine baseline modeling component 34 builds an engine baseline model from the data processed by the preprocessor 32. In particular, the engine baseline model built by the engine baseline modeling component relates the selected performance variables as a function of engine operating conditions using the processed data. Engine operating conditions include engine, aircraft and environmental conditions. In this disclosure, the engine baseline model is built from a regression analysis. Generally speaking, a regression is the statistical science of determining an equation from a finite number of points that provides values of Y for a given X, i.e., Y=f(X). In this disclosure, the equation to be determined can be expressed as:

$$Y = f(\text{altitude, temperature, power setting, air speed}) \quad (1)$$

where altitude, temperature, power setting and air speed are the X variables. The engine baseline modeling component 34 performs a regression to determine the above equation for each of the selected engine performance variables (i.e., power setting, altitude, air speed, and air temperature) during specified times that the engine is operating. For instance, the engine modeling component 34 can perform the regression on the data taken during the take-off, climb and cruise for any or all of the engine performance variables. One of ordinary skill in the art will recognize that more engine performance variables (air humidity, control settings, etc.) or less engine performance variables can be used in equation 1. In addition, one of ordinary skill in the art will recognize that different combinations of engine performance variables can be used in equation 1.

In general, a regression fits a parametric equation to a set of data by solving for values of regression parameters such that the best fit to the data set is obtained. Multiple linear regression is a type of regression that solves the system of equations, minimizing the combined error. In this disclosure, the system of equations that the regression solves can be as follows:

$$y[1] = a * \text{power setting}[1] + b * \text{altitude}[1] + \quad (2)$$
$$c * \text{temperature}[1] + d * \text{airspeed}[1] + \ldots + \text{error}[1]$$
$$y[2] = a * \text{power setting}[2] + b * \text{altitude}[2] +$$
$$c * \text{temperature}[2] + d * \text{airspeed}[2] + \ldots + \text{error}[2]$$
$$\ldots$$

-continued
$$y[n] = a * \text{power setting}[n] + b * \text{altitude}[n] +$$
$$c * \text{temperature}[n] + d * \text{airspeed}[n] + \ldots + \text{error}[n]$$

wherein a, b, c, d are the regression parameters and power setting[1], altitude[1], temperature[1], airspeed[1], y[1] are observed events. Again, one of ordinary skill in the art will recognize that the system of equations can differ depending on the selection of engine performance variables.

The resulting parameter estimates for a, b, c and d are representative of the new baseline model. Instead of using tables to develop the baseline model as was done in the past, there is now a simple equation that describes the baseline behavior of the engine, from which either the tables may be generated, or the equation can be applied directly. For example, a baseline model for the exhaust gas temperature (EGT) parameter might be as follows:

$$EGT = 0.1 * \text{power} + 0.001 * \text{altitude} + 0.01 * \text{temperature} + 0.05 * \text{airspeed} \quad (3)$$

In this example, an engine that had power set to 100, altitude at 1000, temperature at 300, and air speed at 200, would result in a predicted EGT value of 24 degrees, but might have a measured EGT value of 14 degrees, which would indicate that the engine was 10 degrees below the predicted value.

The engine baseline modeling component 34 also comprises a metric component 44 that validates the engine baseline model. In particular, the metric component 44 validates the engine baseline model by examining the quality of the built model. In this disclosure, the metric component 44 determines the goodness of model fit by analyzing statistical goodness of fit metrics, such as R-squared, which is a common regression tool output. One of ordinary skill in the art will recognize that the metric component 44 can determine other metrics besides the R-squared metric such as the mean square error, sum square error and sigma metrics, which are other common regression tool outputs.

The engine baseline modeling component 34 also comprises a data cleaning heuristics component 46 that cleans the preprocessed data according to a set of heuristics. Generally, the data cleaning heuristics component 46 uses heuristics to remove data that does not conform to the norm. An illustrative, but non-exhaustive list of data that the data cleaning heuristics component 46 removes includes regression outliers, regression leverage points, and faulty engines. In this disclosure, this data cleaning operation can be performed for groups of engines or fleets of aircraft that use a common engine.

Additional details and embodiments relating to the engine baseline modeling component 34 will be set forth in detail below. In particular, inventive techniques are provided which additionally enhance the quality and reliability of the generated model.

FIG. 2 also shows that the engine baseline modeling system 28 comprises a model diagnostics component 36 that evaluates the performance of the engine baseline model. In particular, the model diagnostics component 36 generates statistical outputs that provide statistical information to a user of the engine baseline modeling system 28. An illustrative, but non-exhaustive list of the statistical outputs that the model diagnostics component 36 generates includes variance, $r^2$, collinearity, probability plots, residual plots, standard error measurements, confidence limits on the engine baseline model, prediction limits, pure error lack-of-fit test, data subsetting lack-of-fit test, multicolinearity metrics (variance inflation factors), autocorrelation of residuals (Durbin-Watson statistic), etc. Additional details relating to specific embodiments of the model diagnostics component 36 will be set forth in additional detail below with respect to FIG. 5.

The algorithms performed by the components in the engine baseline modeling system 28 (i.e., the preprocessor 32, engine baseline modeling component 34 and model diagnostics component 36 can be programmed with a commercially available statistical package such as SAS, but other languages such as C or Java may also be used.

The engine baseline modeling system 28 is not limited to a software implementation. For instance, the preprocessor 32, engine baseline modeling component 34 and model diagnostics component 36 may take the form of hardware or firmware or combinations of software, hardware, and firmware. In addition, the engine baseline modeling system 28 is not limited to the preprocessor 32, engine baseline modeling component 34 and model diagnostics component 36. One of ordinary skill in the art will recognize that the engine baseline modeling system 28 may have other components.

Figure 3:
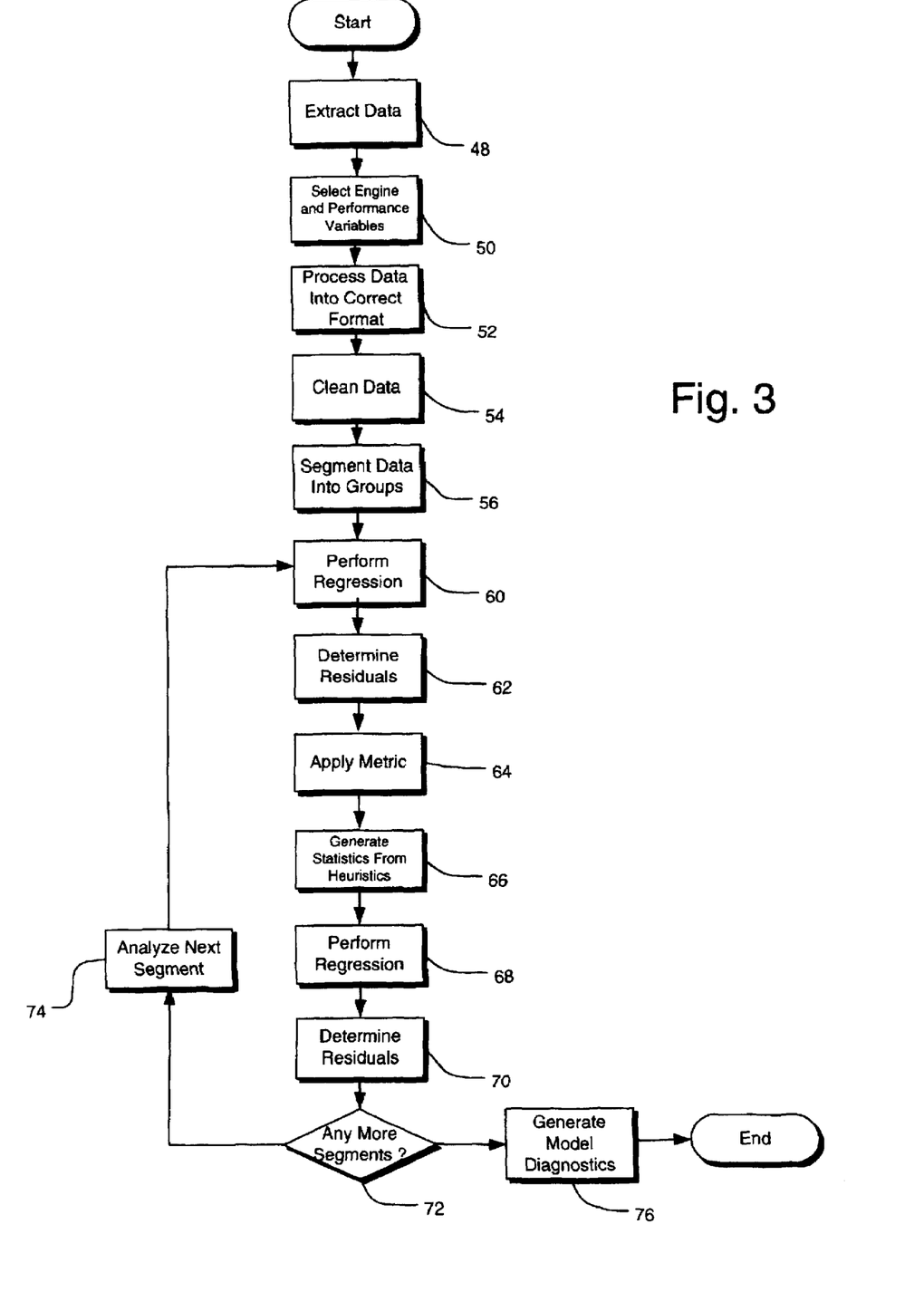
FIG. 3 shows a flow chart describing actions performed by the engine baseline modeling system shown in FIG. 2.

FIG. 3 shows a flow chart describing actions performed by the engine baseline modeling system 28 shown in FIG. 2. At block 48, the data acquisition component 38 extracts the engine data from the engine service database 30. Next, at 50 the user of the engine baseline modeling system 28 selects a particular engine model and engine performance variables for that engine that he or she would like to model (e.g., power setting, altitude, air speed and air temperature). The preprocessor 32 converts data into a standardized format at 52 and the data scrubbing component 40 cleans the engine data at 54. The data segmenting component 42 then segments the engine data into groups such as altitude, air speed and air temperature, fuel specific heat value, air humidity, control settings, etc. at 56.

After the data segmenting component 42 has segmented the engine data into groups, the engine baseline modeling component 34 builds an engine baseline model from the data processed by the preprocessor 32. In particular, the building of the engine baseline model begins with the engine baseline modeling component 34 performing a regression to determine parameters for each of the selected engine performance variables (e.g., altitude, air speed and air temperature) at 60. As mentioned above, the regression relates the engine performance variables as a function of engine operating conditions. The metric component 44 then determines the residuals of the regression at 62 and applies the metrics (e.g., R-square, mean square error, sum square error and sigma metrics) at 64. The term residuals refers to the differences between the actual values of the dependent variables and their predicted or estimated value for a particular observation. Next, the data cleaning heuristics component 46 cleans the preprocessed data according to a set of heuristics and generates certain statistics such as outliers and leverage points at 66.

The engine baseline modeling component 34 then performs another regression at 68. The engine baseline modeling component 34 applies a second regression to improve the parameter estimates by using a cleaner data set. Again, the metric component 44 determines additional residuals at 70. Alternatively, the metric component 44 can generate plots of the residuals if a user desires. At 72, the engine baseline modeling component determines whether there are any more segments that have to be analyzed. If there are more segments, then the next segment is analyzed at 74 and blocks 60-72 are repeated. This process continues until it is determined at 72 that there are no more segments. Once it has been determined that there are no more segments, then the model diagnostics component 36 evaluates the performance of the engine baseline model at 76 and generates certain statistical outputs that relate to the model.

The foregoing flow chart of FIG. 3 of this disclosure shows the functionality and operation of the engine baseline modeling system 28. In this regard, each block represents a module, segment, or portion of code, which comprises one or more executable instructions for implementing the specified logical function(s). It should also be noted that in some alternative implementations, the functions noted in the blocks may occur out of the order noted in the figures or, for example, may in fact be executed substantially concurrently or in the reverse order, depending upon the functionality involved. Furthermore, the functions can be implemented in programming languages such as C and Java, however, other computer programming languages can be used. Also, the engine service database 30 may be constructed using commercial databases including standard relational, object-oriented or hierarchical databases. Data manipulation operations, including retrieval, creation, modification, and deletion, can be implemented within the programming languages or within the database using stored procedures or triggers or combinations.

The above-described engine baseline modeling system 28 comprises an ordered listing of executable instructions for implementing logical functions. The ordered listing can be embodied in any computer-readable medium for use by or in connection with a computer-based system that can retrieve the instructions and execute them. In the context of this application, the computer-readable medium can be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

Note that the computer readable medium may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

Figure 4:
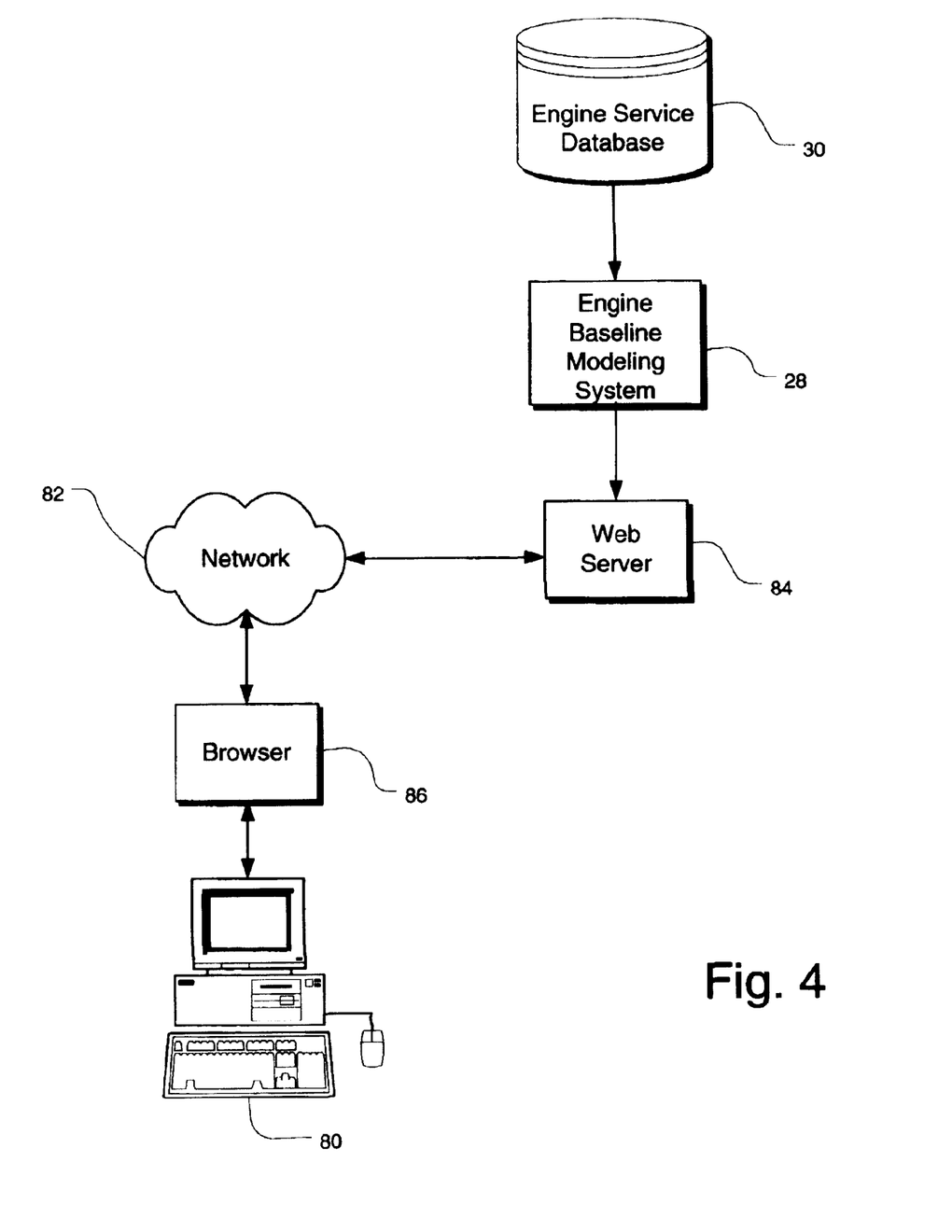
FIG. 4 shows an architectural diagram of a system for implementing the engine baseline modeling system shown in FIG. 2.

FIG. 4 shows an architectural diagram of a system 78 for implementing the engine baseline modeling system 28 shown in FIG. 2 in a networked environment. In FIG. 4, a user uses a computing unit 80 to access the engine baseline modeling system 28 and engine service database 30. More specifically, the computing unit 80 connects to the engine baseline modeling system 28 and engine service database 30 through a communication network 82 such as an electronic or wireless network. The computing unit 80 can take the form of a hand-held digital computer, personal digital assistant computer, notebook computer, personal computer or workstation, while the communications network may be a private network such as an extranet or intranet or a global network such as a WAN (e.g., Internet). A web server 84 serves the engine baseline modeling system 28 and the engine service database 30 to the user in the form of web pages. The web pages can be in the form of HTML, however, other formats and structures can be used such as SGML, XML or XHTML. The user uses a web browser 86 running on the computing unit 80 such as Microsoft INTERNET EXPLORER, Netscape NAVIGATOR or Mosaic to locate and display the web pages generated from the engine baseline modeling system 28 and engine service database 30.

If desired, the system 78 may have functionality that enables authentication and access control of users accessing the web pages linked to the engine baseline modeling system 28. Both authentication and access control can be handled at the web server level by a commercially available package such as Netegrity SITEMINDER. Information to enable authentication and access control such as the user names, location, telephone number, organization, login identification, password, access privileges to certain resources, physical devices in the network, services available to physical devices, etc. can be retained in a database directory. The database directory can take the form of a lightweight directory access protocol (LDAP) database, however, other directory type databases with other types of schema may be used including relational databases, object-oriented databases, flat files, or other data management systems.

Figure 5:
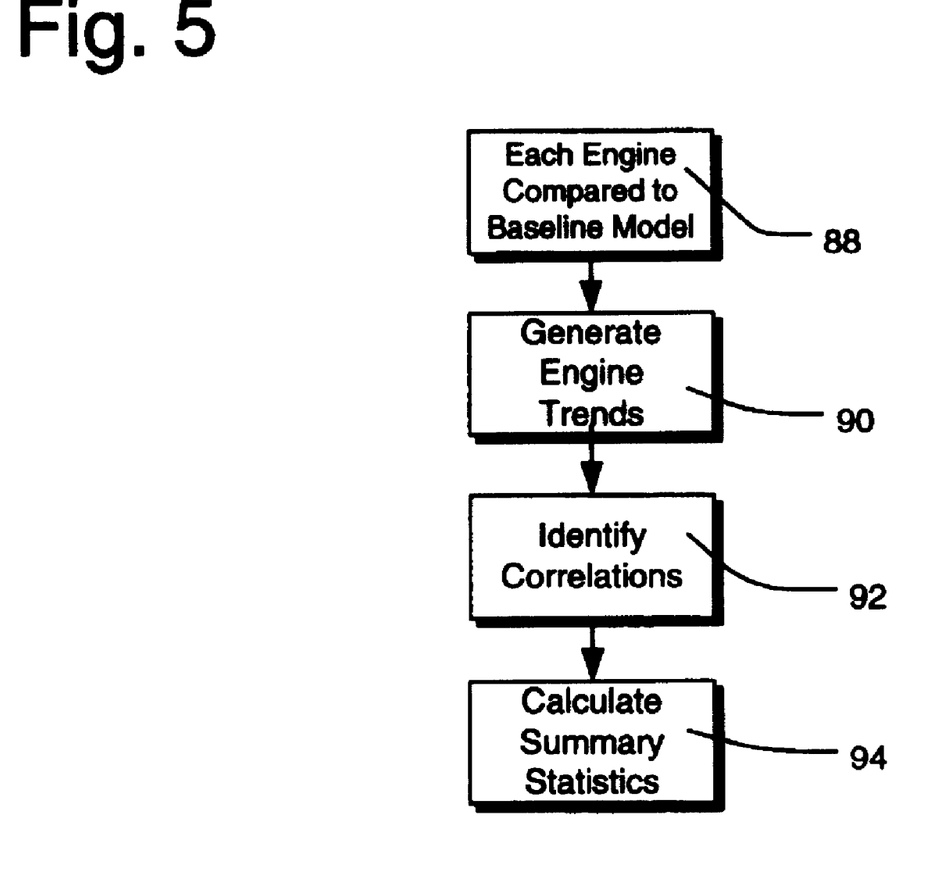
FIG. 5 is a flow chart describing one embodiment for evaluating a baseline model.

In accordance with an additional embodiment of the present invention, baseline models generated in the manner set forth above may be further analyzed in relation to specific engine data to generate engine trends. Referring now to FIG. 5, there is shown a flow chart illustrating one embodiment of a method for determining the quality of a baseline model. Initially, in block 88, each of a plurality or fleet of engines for which the overall baseline model is calculated is compared with the baseline model. Engine trends over a plurality of flights are then generated for each engine in block 90. In one embodiment, the engine trends include the baseline residuals and various parameters (e.g., fan speed, altitude, temperature) for each engine.

Next, in block 92, the generated engine trends are analyzed for the presence of correlations to various engine, aircraft, or environmental parameters (e.g., engine age, wear, repair, etc.) as represented by a correlation coefficient. In one embodiment, the correlation arises out of a comparison between the residuals and the various key parameters. In a perfect baseline model having no correlations, such an analysis would result in correlation coefficients indicative of only random noise, rather than an actual correlation. That is perfect baselines, every engine have no correlation to the key parameters. However, as the distribution in correlation coefficients becomes wider, the worse the model performs.

For each correlation identified in block 92, summary statistics are calculated (e.g., mean, standard deviation, histograms, etc.) in block 94. These statistics reflect the degree to which the baseline model is potentially skewed by the respective parameter. A good baseline model will have correlations whose mean measurements tend toward zero. This indicates a less biased model. For histograms, a good baseline generates correlation histograms also tending toward zero. In one embodiment, a good baseline may be evaluated by calculating the percentage of its histogram falling between −0.3 and 0.3. Similarly, those correlations having lower standard deviations are also deemed to be more stable and therefore reflect a good baseline. Because multiple engine baselines are typically generated for a particular group of engines, summary statistics of the correlations can be used to evaluate the relative goodness of the generated models.

Figure 6:
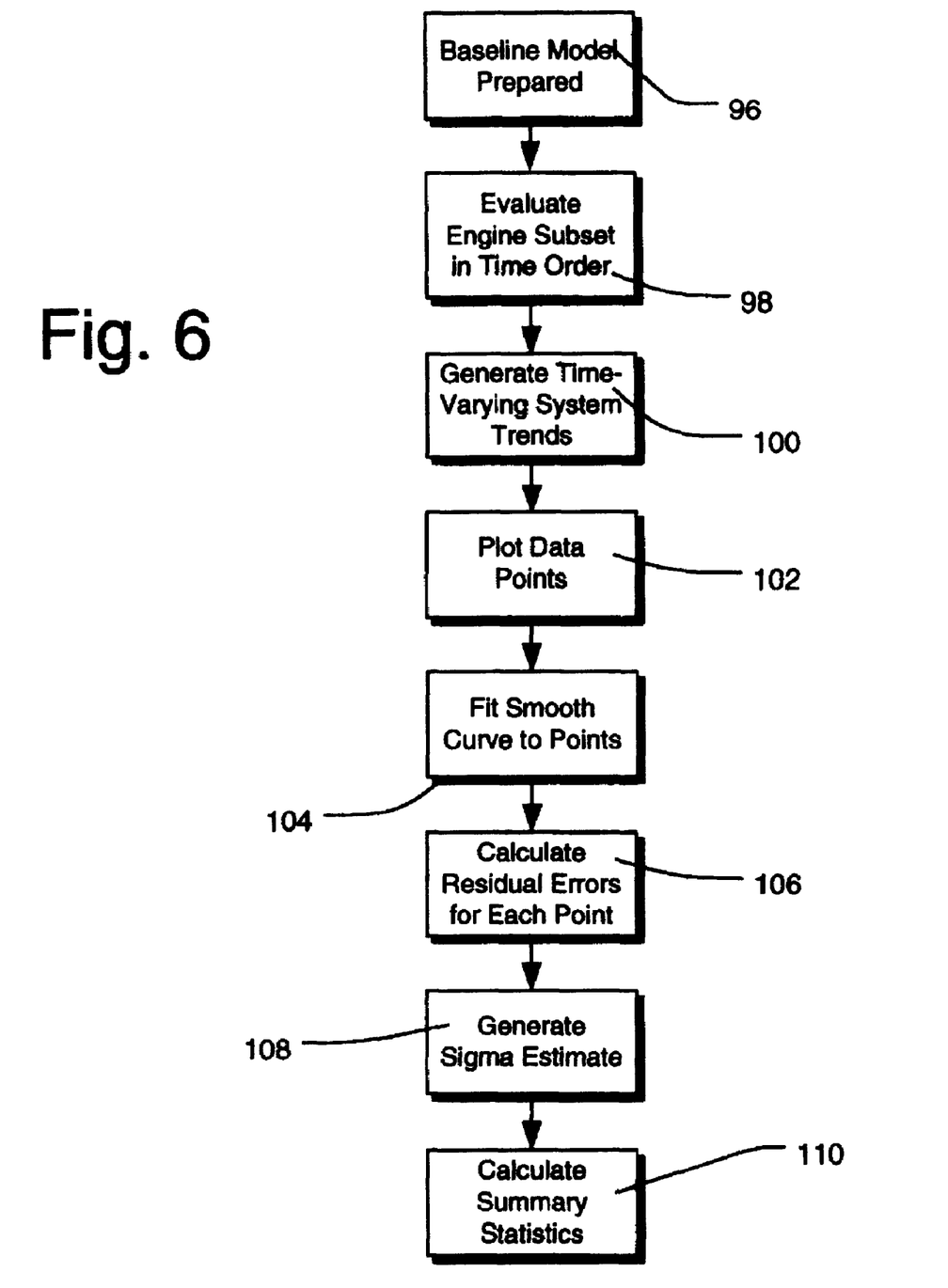
FIG. 6 is a flow chart describing an additional embodiment for evaluating a baseline model.

Referring now to FIG. 6, there is shown another embodiment of a method for evaluating a baseline model. Initially, in block 96, a baseline model is prepared in the manner set forth in detail above. In block 98, a single engine or subset of the plurality of engines used to create the model are evaluated in time order against the generated baseline. Unlike the initial baseline model created above, the time-varying trends are also utilized in the present method to better identify good models. Time varying system trends are then generated in block 100. In one embodiment, the time-varying system trends include a plot of residual values over time.

Next, in block 102, the data points representative of the trends generated in block 100 are plotted over time. Each trend has been seen to fluctuate based upon factors not considered during the initial regression analysis described above. In block 104, a smoothed curve is then fit to the points plotted. Residual errors are computed for each point in block 106. The residual errors reflect the amount by which each trend point varies from the smoothed curve.

Once residual errors for each trend point have been generated, an estimate of the sigma is calculated by performing a root mean squared error calculation in block 108. In block 110, summary statistics (e.g., mean, standard deviation, histograms) are calculated using the sigma estimates calculated in block 108. It has been determined that those models having smaller sigma estimates and histograms having lower mean measurements are representative of better models having less noise.

It is apparent that there has been provided in accordance with this invention, a baseline modeling system, method and computer product. While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

The invention claimed is:

1. A system for quantifying baseline model quality, comprising:
    an engine service database containing engine data;
    a preprocessor for processing the engine data into a predetermined format;
    an engine baseline modeling component that builds an engine baseline model from the preprocessed data, wherein the engine baseline model relates engine performance variables as a function of engine operating conditions; and
    a model diagnostics component that evaluates the performance of the engine baseline model, wherein the model diagnostics component includes:
        means for comparing engine data from a plurality of engines against the engine baseline model;
        means for generating engine trends for each of the plurality of engines;
        means for identifying correlations between the engine trends and various parameters; and
        means for calculating, for each identified correlation, summary statistics relating to the degree of correlation, wherein the model diagnostics component is configured to use the summary statistics to evaluate the performance of the engine baseline model, and wherein the system is configured to use the engine baseline model to perform at least one of monitoring engine status, predicting future engine behavior, diagnosing engine faults, determining engine performance, determining engine quality and designing new engine systems.

2. The system of claim 1, wherein the means for identifying correlations between engine trends and various parameters further generate correlation coefficients for each identified correlation.

3. The system of claim 1, wherein the summary statistics include at least one of a standard deviation, a mean, or a histogram for each identified correlation.

4. The system of claim 3, wherein a good model is best represented by summary statistics tending toward zero.

5. A system for quantifying baseline model quality, comprising:
an engine service database containing engine data;
a preprocessor for processing the engine data into a predetermined format;
an engine baseline modeling component that builds an engine baseline model from the preprocessed data, wherein the engine baseline model relates engine performance variables as a function of engine operating conditions; and
a model diagnostics component that evaluates the performance of the engine baseline model, wherein the model diagnostics component includes:
means for evaluating, a subset of the engines used to create the model in time order against the generated baseline;
means for generating time-varying system trends;
means for plotting data points representative of the time-varying system trends over time;
means for fitting a smoothed curve to the plotted data points; and
means for computing residual errors for each point, wherein the model diagnostics component is configured to use the residual errors to evaluate the performance of the engine baseline model, and wherein the system is configured to use the engine baseline model to perform at least one of monitoring engine status, predicting future engine behavior, diagnosing engine faults, determining engine performance, determining engine quality and designing new engine systems.

6. The system of claim 5, wherein residual errors computed reflect the amount by which each trend point varies from the smoothed curve.

7. The system of claim 5, wherein the model diagnostics component further comprises:
means for estimating a sigma value by performing a root mean squared error calculation; and
means for generating summary statistics using the estimated sigma values.

8. The system of claim 7, wherein a good model is best represented by lower estimated sigma values.

9. A method for quantifying baseline model quality, comprising:
storing engine data in an engine service database;
processing the engine data into a predetermined format;
building an engine baseline model from the preprocessed data, wherein the engine baseline model relates engine performance variables as a function of engine operating conditions;
evaluating performance of the engine baseline model, wherein evaluating the performance of the engine baseline model comprises:
comparing engine data from a plurality of engines against the engine baseline model;
generating engine trends for each of the plurality of engines;
identifying correlations between the engine trends and various parameters; and
calculating, for each identified correlation, summary statistics relating to the degree of correlation;
wherein the method further comprises using the summary statistics to evaluate the performance of the engine baseline model, and wherein the engine baseline model is used to perform at least one of monitoring engine status, predicting future engine behavior, diagnosing engine faults, determining engine performance, determining engine quality and designing new engine systems.

10. The method of claim 9, wherein identifying correlations between engine trends and various parameters further comprises generating correlation coefficients for each identified correlation.

11. The method of claim 9, wherein the summary statistics include at least one of a standard deviation, a mean, or a histogram for each identified correlation.

12. The method of claim 11, wherein a good model is best represented by summary statistics tending toward zero.

13. A method for quantifying baseline model quality, comprising:
storing engine data in an engine service database;
processing the engine data into a predetermined format;
building an engine baseline model from the preprocessed data, wherein the engine baseline model relates engine performance variables as a function of engine operating conditions;
evaluating performance of the engine baseline model, wherein evaluating the performance of the engine baseline model comprises:
evaluating a subset of the engines used to create the model in time order against the generated baseline;
generating time-varying system trends;
plotting data points representative of the time-varying system trends over time;
fitting a smoothed curve to the plotted data points; and
computing residual errors for each point;
wherein the method further comprises using the residual errors to evaluate the performance of the engine baseline model, and wherein the engine baseline model is used to perform at least one of monitoring engine status, predicting future engine behavior, diagnosing engine faults, determining engine performance, determining engine quality and designing new engine systems.

14. The method of claim 13, wherein residual errors computed reflect the amount by which each trend point varies from the smoothed curve.

15. The method of claim 13, further comprising:
estimating a sigma value by performing a root mean squared error calculation; and
generating summary statistics using the estimated sigma values.

16. The method of claim 15, wherein a good model is best represented by lower estimated sigma values.

17. A computer-readable medium storing computer instructions for instructing a computer system to quantify baseline model quality, the computer instructions comprising:
one or more instructions for storing engine data in an engine service database;
one or more instructions for processing the engine data into a predetermined format;
one or more instructions for building an engine baseline model from the preprocessed data, wherein the engine baseline model relates engine performance variables as a function of engine operating conditions;

one or more instructions for evaluating performance of the engine baseline model, wherein evaluating the performance of the engine baseline model comprises:
  one or more instructions for comparing engine data from a plurality of engines against the engine baseline model;
  one or more instructions for generating engine trends for each of the plurality of engines;
  one or more instructions for identifying correlations between the engine trends and various parameters;
  one or more instructions for calculating, for each identified correlation, summary statistics relating to the degree of correlation; and
one or more instructions for using the summary statistics to evaluate the performance of the engine baseline model, wherein the engine baseline model is used to perform at least one of monitoring engine status, predicting future engine behavior, diagnosing engine faults, determining engine performance, determining engine quality and designing new engine systems.

18. The computer-readable medium of claim 17, wherein the one or more instructions for identifying correlations between engine trends and various parameters further comprise one or more instructions for generating correlation coefficients for each identified correlation.

19. The computer-readable medium of claim 17, wherein the summary statistics include at least one of a standard deviation, a mean, or a histogram for each identified correlation.

20. The computer-readable medium of claim 19, wherein a good model is best represented by summary statistics tending toward zero.

21. A computer-readable medium storing computer instructions for instructing a computer system to quantify baseline model quality, the computer instructions comprising:
  one or more instructions for storing engine data in an engine service database;
  one or more instructions for processing the engine data into a predetermined format;
  one or more instructions for building an engine baseline model from the preprocessed data, wherein the engine baseline model relates engine performance variables as a function of engine operating conditions;
  one or more instructions for evaluating performance of the engine baseline model, wherein evaluating the performance of the engine baseline model comprises:
    one or more instructions for evaluating a subset of the engines used to create the model in time order against the generated baseline;
    one or more instructions for generating time-varying system trends;
    one or more instructions for plotting data points representative of the time-varying system trends over time;
    one or more instructions for fitting a smoothed curve to the plotted data points;
    one or more instructions for computing residual errors for each point; and
  one or more instructions for using the residual errors to evaluate the performance of the engine baseline model, wherein the engine baseline model is used to perform at least one of monitoring engine status, predicting future engine behavior, diagnosing engine faults, determining engine performance, determining engine quality and designing new engine systems.

22. The computer-readable medium of claim 21, wherein residual errors computed reflect the amount by which each trend point varies from the smoothed curve.

23. The computer-readable medium of claim 21, further comprising:
  one or more instructions for estimating a sigma value by performing a root mean squared error calculation; and
  one or more instructions for generating summary statistics using the estimated sigma values.

24. The computer-readable medium of claim 23, wherein a good model is best represented by lower estimated sigma values.

* * * * *